Oct. 24, 1961  A. I. ZAGAR  3,005,526
CONICAL CLUTCH SLEEVES FOR TAPPING ATTACHMENTS
Filed Oct. 10, 1958
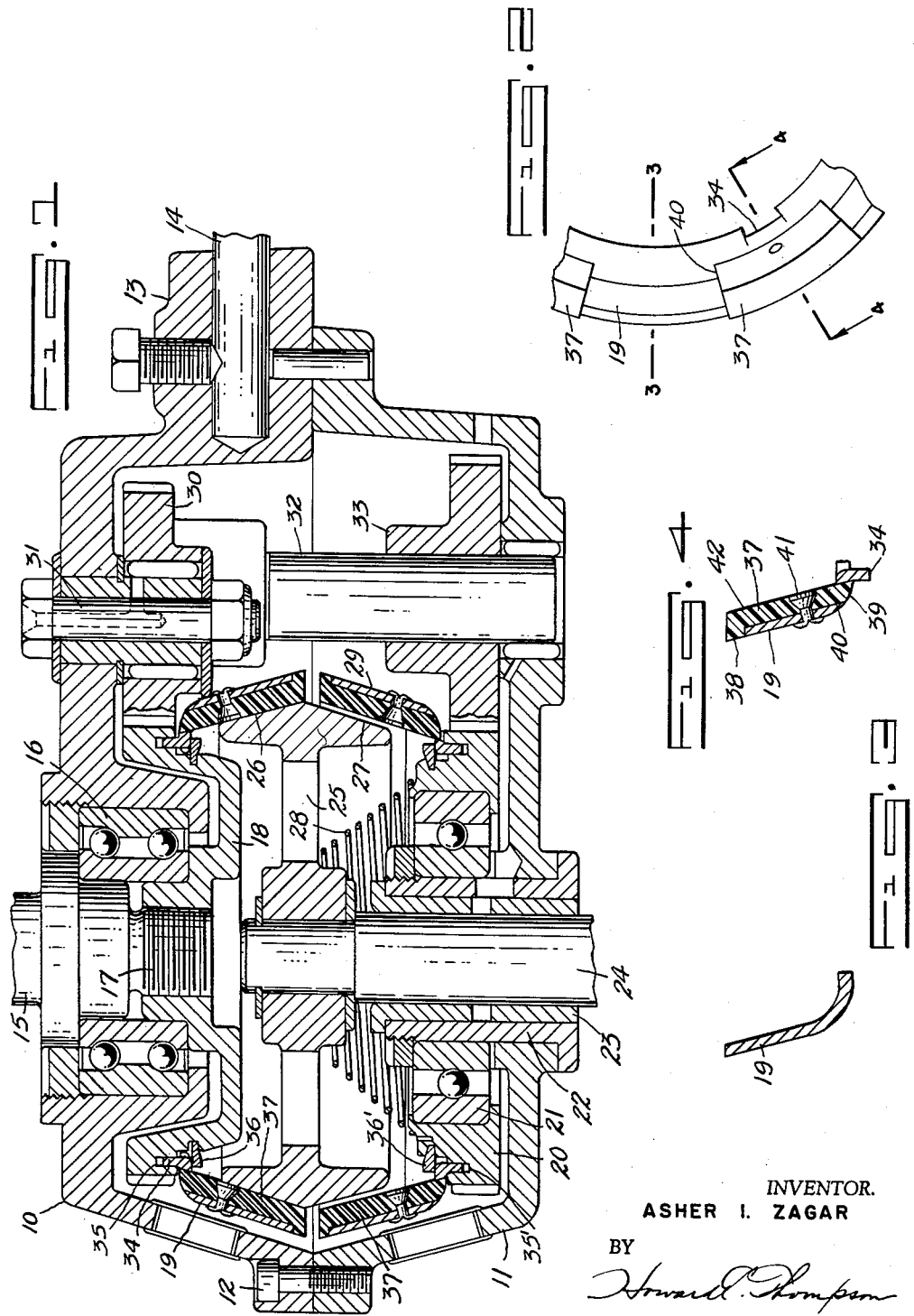
INVENTOR.
ASHER I. ZAGAR
BY
*Howard P. Thompson*
ATTORNEY.

United States Patent Office 3,005,526
Patented Oct. 24, 1961

3,005,526
CONICAL CLUTCH SLEEVES FOR
TAPPING ATTACHMENTS
Asher I. Zagar, Brooklyn, N.Y., assignor to Ettco Tool
& Machine Co., Inc., Brooklyn, N.Y., a corporation
of New York
Filed Oct. 10, 1958, Ser. No. 766,548
2 Claims. (Cl. 192—51)

This invention relates to tapping attachments employing forward and reverse drive clutch sleeves in actuation of a tool spindle in forward and reverse drives of the spindle. More particularly, the invention deals with a clutch sleeve structure of the character described, wherein the inner conical bearing surface of the clutch sleeve includes circumferentially and widely spaced gripper shoes of plastic or similar material and, wherein, the spacing between adjacent shoes is substantially equal to the circumferential dimensions of each shoe to thereby provide an effective frictional drive of the clutch sleeves to the clutch head coupled with the driven tool spindle of the attachment.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a longitudinal broken sectional view through a tapping attachment made according to my invention showing my improved clutch sleeves in section.

FIG. 2 is a plan view of a portion of one of the clutch sleeves shown in FIG. 1.

FIG. 3 is a section on the line 3—3 of FIG. 2; and

FIG. 4 is a section on the line 4—4 of FIG. 2.

My present invention deals with tapping attachments, generally of the type and kind disclosed in Patent No. 2,613,786 of October 14, 1952, and, as the present invention deals primarily with the construction of the clutch sleeves, the general structure of the attachment will be described in limited detail.

The attachment, as noted in FIG. 1 of the drawing, comprises two casings 10 and 11, secured together, as indicated at 12, the casing 10 having an offset portion 13, with which a rod 14 is coupled to prevent rotation of the attachment in the use thereof. At 15 is indicated part of the drive spindle mounted in a suitable bearing 16 in the casing and having a reduced threaded end 17 for direct coupling with a forward drive gear element 18 supporting a forward drive clutch sleeve or shell 19.

A reverse drive gear element 20 has a ball bearing mounting 21 on a sleeve 22 supported in the casing 11, the sleeve 22 including a bearing bushing 23, in which the tool supporting driven spindle 24 operates.

The inner or upper end of the spindle 24 has suitably keyed thereto a double faced conical clutch head 25, the bevelled surfaces of which are indicated at 26 and 27. A spring 28 is employed to normally support the head 25 in the forward drive position, as noted in FIG. 1 of the drawing, while, at the same time, permitting movement of the head 25 into engagement with a reverse drive clutch sleeve or shell 29 coupled with the gear element 20.

The gear element 18 actuates an idler pinion 30 supported on a stub shaft 31, the pinion 30 operatively engaging an upper gear, not shown, on a shaft 32, the latter engaging a lower gear 33, which operatively engages the gear element 20 to accomplish the reverse drive of the element 20, as is well-known in this art.

Each of the clutch sleeves 19 and 29 are of the same construction, thus the brief description of one will apply to both. These sleeves are in the form of sheet metal shells having, at their small diameter ends, circumferentially spaced key tongues 34, note FIG. 4 of the drawing, which are adapted to enter key notches or recesses 35, 35' in the elements 18 and 20, respectively, as noted in FIG. 1 of the drawing, to definitely key the sleeves 19 and 29 on the gear elements 18 and 20, respectively, the sleeves being held in position by split rings, as at 36, 36' in FIG. 1 of the drawing.

Supported upon the inner surfaces of the sleeves or shells 19, 29 are circumferentially spaced gripper shoes 37, the shoes 37 having flanged end portions 38 overlying the wide or large diameter end portions of the sleeves or shells 19, 29 and contracted end portions 39, which extend into apertures or sockets 40 at the small diameter end of the sleeves or shells 19, 29, note FIG. 4, thus definitely keying and retaining the shoes 37 in position on the sleeves or shells 19, 29.

To further secure the shoes in position, suitable fastening devices, as at 41, are employed to further retain the shoes against displacement, the devices 41 being countersunk in the shoes to fully and completely expose the inner surfaces 42 thereof for frictional engagement with the surfaces 26—27 of the head 25.

Considering FIG. 2 of the drawing, it will appear that adjacent shoes 37 of each of the sleeves 19, 29 are widely spaced. As a matter of fact, the spacing is substantially equal to the circumferential dimension of each shoe. By reason of this construction, a perfect wiping effect is accomplished of the shoes on the surfaces 26, 27 of the head in displacing oil or other film that may otherwise prevail thereon in the forward and reverse drives of the attachment. This provides a positive and, yet, yieldable engagement of the gripper shoes with the surfaces 26 and 27 in both the forward and reverse drives of the attachment.

The gripper shoes 37 are preferably formed of molded plastic material, such for example as nylon or Delrin, and, in fact, in some instances, ceramic materials could be employed in formation of the shoes, depending entirely upon the intended use. In this connection, it will be apparent that the present illustration is for the purpose of indicating one adaptation and use of a friction drive between a driving member and a member to be driven.

By utilizing molded gripper shoes of the type and kind defined and providing a simple attachment to their supports such, for example, as the sleeves or shells 19, 29, a very economical clutch element can be produced.

At this time, it is also pointed out that any means, such as a suitable adhesive, can be employed in place of the fastening devices 41 for retaining the gripper shoes in position and this is particularly true as and when the keying means, as at 40, is employed.

Having fully described my invention, what I claim as new and desire to secure by Letters Patent is:

1. In devices of the character described employing forward and reverse drive conical clutch sleeves operatively engaging a tool spindle driving clutch head, each of said sleeves forming large and small diameter ends thereon, said sleeves having circumferentially spaced and extending gripper shoes operatively engaged by said head in forward and reverse drives of said spindle, said shoes each comprising a body of molded material, the small diameter ends of said sleeves having circumferentially spaced and extending apertures, the full circumferential width of inner contracted ends of said shoes extending into said apertures in keying the shoes to said sleeves, means for securing the shoes to inner surfaces of said sleeves, and each shoe having a flange portion extending the full circumferential width of the shoe and overlying the large diameter end of the sleeves.

2. A friction drive member of the character described, comprising a conical clutch sleeve having large and small diameter ends, a plurality of plastic gripper shoes arranged upon the inner surface of the sleeve and extending and spaced circumferentially thereof, the spacing between adjacent shoes on the sleeve being substantially equal to the circumferential extension of each shoe on the sleeve, said shoes having at one end flanges extending the full width thereof overlying the large diameter end of the sleeve, the small diameter end portion of the sleeve having circumferentially spaced and extending apertures, the full width of the other end of the shoes extending into said apertures to key the shoes on the sleeve, and means intermediate ends of the shoes for securing the shoes to the inner surface of the sleeve.

References Cited in the file of this patent

UNITED STATES PATENTS

| | | |
|---|---|---|
| 506,767 | Campany | Oct. 17, 1893 |
| 587,319 | Lizotte | Aug. 3, 1897 |
| 2,162,250 | Emrick | June 13, 1939 |
| 2,208,747 | Campbell | July 23, 1940 |
| 2,236,508 | Lesage | Apr. 1, 1941 |
| 2,613,786 | Emrick | Oct. 14, 1952 |
| 2,705,113 | Bonanno | Mar. 29, 1955 |

FOREIGN PATENTS

| | | |
|---|---|---|
| 57,604 | France | Dec. 30, 1952 |